(12) United States Patent
Brunswig et al.

(10) Patent No.: US 7,685,114 B2
(45) Date of Patent: Mar. 23, 2010

(54) SYSTEMS AND METHODS FOR MAPPING TEXT

(75) Inventors: Frank Brunswig, Heidelberg (DE);
Thomas Gauweiler, Speyer (DE);
Martin Hartig, Speyer (DE); Joerg Lienhardt, Walldorf (DE); Dirk Stumpf, Gragen-Neudorf (DE);
Johannes Viegener, Karlsruhe (DE)

(73) Assignee: SAP AG, Walldorf (DE)

( * ) Notice: Subject to any disclaimer, the term of this patent is extended or adjusted under 35 U.S.C. 154(b) by 414 days.

(21) Appl. No.: 11/234,198

(22) Filed: Sep. 26, 2005

(65) Prior Publication Data

US 2007/0073702 A1 Mar. 29, 2007

(51) Int. Cl.
*G06F 7/00* (2006.01)
(52) U.S. Cl. .......................................... 707/4
(58) Field of Classification Search ............ 707/4; 715/235, 200, 234, 236, 239, 255, 256, 222; 709/228
See application file for complete search history.

(56) References Cited

U.S. PATENT DOCUMENTS

| | | | | |
|---|---|---|---|---|
| 5,911,485 A * | 6/1999 | Rossmann | ................... | 341/22 |
| 6,164,974 A * | 12/2000 | Carlile et al. | ................ | 434/322 |
| 6,199,059 B1 * | 3/2001 | Dahan et al. | .................... | 707/3 |
| 6,307,548 B1 * | 10/2001 | Flinchem et al. | ............ | 715/811 |
| 6,407,679 B1 * | 6/2002 | Evans et al. | ................... | 341/20 |
| 2002/0073001 A1 * | 6/2002 | Palmer et al. | ................. | 705/29 |
| 2002/0178038 A1 * | 11/2002 | Grybas | ........................... | 705/7 |
| 2004/0015496 A1 * | 1/2004 | Anonsen | ........................ | 707/4 |

* cited by examiner

*Primary Examiner*—Cheyne D Ly
(74) *Attorney, Agent, or Firm*—Mintz, Levin, Cohn, Ferris, Glovsky & Popeo, P.C.

(57) ABSTRACT

Methods and apparatus, including computer program products, are provided for mapping at run time a value, such as a technical identification (ID) key, to text based on a text association. In one exemplary embodiment, a computer-implemented method includes receiving at run time a request, from a user interface at a client computer, the request associated with an object at a server; instantiating, at a server, a service for mapping at run time the value to text based on the text association, the text association being determined before run time; and at run time providing to a user interface at the client computer, the text based on the text association, such that the text is responsive to the request from the user interface.

17 Claims, 5 Drawing Sheets

SYSTEMS AND METHODS FOR MAPPING TEXT

BACKGROUND

I. Field of the Invention

The present invention relates to data processing and, more particularly, to mapping, at run time, a value, such as a technical identification (ID) key, to text.

II. Background of the Invention

A service represents a self-contained, self-describing program (also referred to as an application) that can be found and accessed by other applications. A service, such as a Web service, is self-contained because the application using the service does not have to depend on anything other than the service itself. A service is also self-describing because all the information on how to use the service can be obtained from the service itself. One example of the use of services is a Service Oriented Architecture (SOA). The SOA can be implemented as middleware, an example of which is SAP's Enterprise Service Framework (ESF).

The SOA can be used to aggregate services into enterprise services that provide meaningful building blocks for the task of automating business processes or tasks. These aggregated services are often referred to as business objects. An "object" means a bundle of variables (e.g., data) and related methods accessed by a software application (also referred to herein as a program or an application). In object-oriented programming, an object is a concrete realization (instance) of a class that consists of data and the operations associated with that data. The phrase business object (BO) thus refers to a bundle of variables and related methods that can be used for describing a business process or task.

Aggregating services allows information technology (IT) organizations to efficiently develop composite applications, which are defined as applications that compose functionality and information from existing services to support new business processes or scenarios. The services can communicate using standard protocols, such as Simple Object Access Protocol (SOAP) and can be described in a central repository.

Furthermore, a SOA may use a repository for organizing services and the information that the services use and produce. An example of a service repository is the Enterprise Services Repository (ESR) of the Enterprise Service Framework (ESF), both of which are commercially available from SAP AG, Walldorf, Germany.

SUMMARY OF THE INVENTION

The present invention provides methods and apparatus, including computer program products, to automatically provide, at run time, a text instead of a value, such as an ID.

In one aspect of the present invention, a computer-implemented method may be provided for mapping at run time a value to a text. The method includes receiving at run time a request, from a user interface at a first computer, the request being associated with one or more object nodes; instantiating, at a second computer, a service for mapping at run time the value to the text based on a text association, the text association being determined before run time; and providing to the user interface at run time, the text determined based on the text association, such that the text is responsive to the request from the user interface.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various embodiments and aspects of the present invention and, together with the description, explain the principles of the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

A business object node (also referred to herein as an object node or a node) refers to a component of a business object. For instance, "Purchase Order" may be a business object, while a "Purchase Order Item" (e.g., a product such as a screw) may be a business object node. Every business object node may be uniquely identified. Each node may be assigned an identification number, which typically is a technical identifier (referred to herein as an ID). The identifier may not be meaningful (or readable) to a human reader.

A business object node may have a text description stored in a text field. A text field is a data structure that holds alphanumeric data, such as a name or an address. A text node may be a business object node containing at least one text field. A description of a business object node may be stored as text in a text field of a text node.

A business object node may have many text descriptions. For instance, if a business object node is a "product," the product may map to various text descriptions. The product can be called "screw" in English, "schraube" in German, and "tornillo" in Spanish, and so forth. Systems and methods consistent with the present invention may map, at run time, an ID to its corresponding text, and provide the corresponding text instead of the ID to a user interface.

Figure 1:
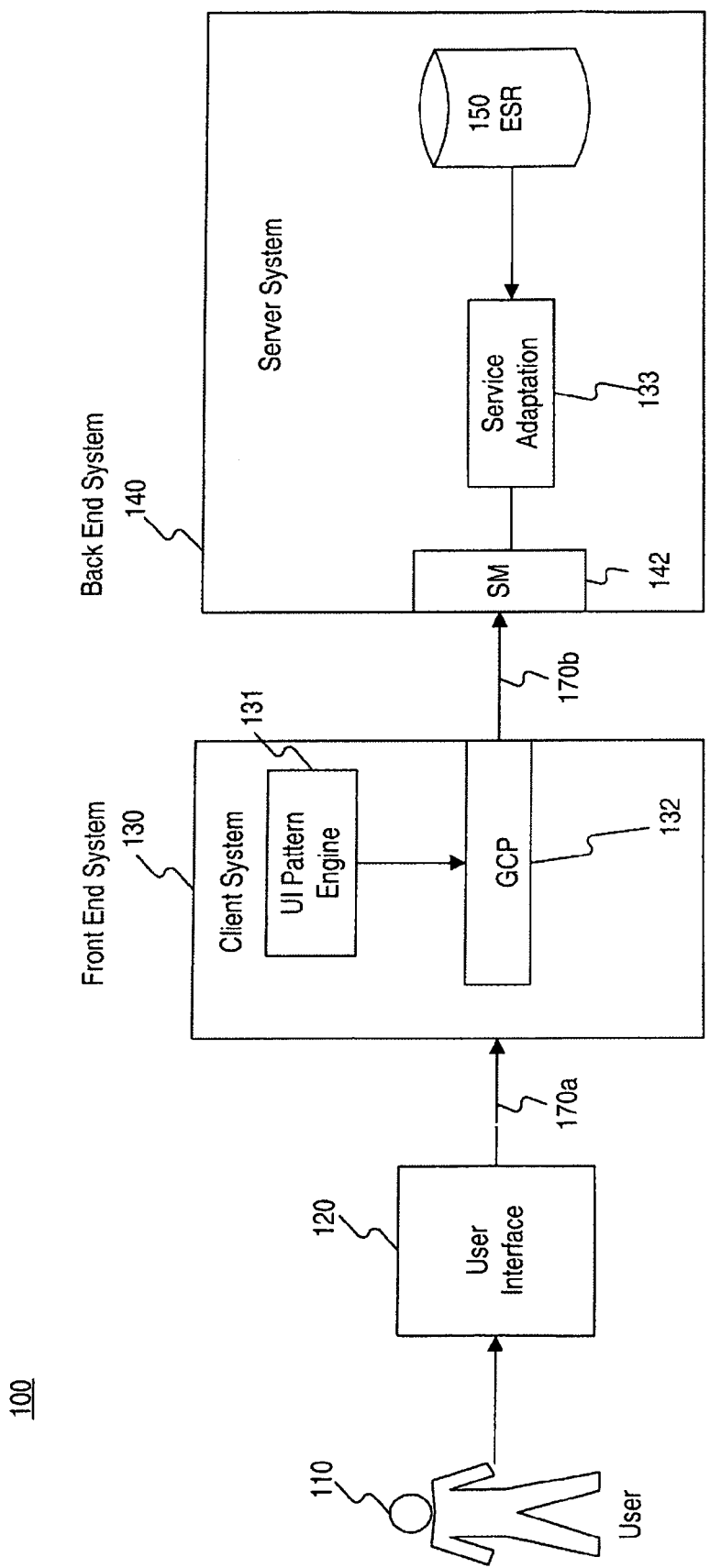
FIG. 1 illustrates an exemplary computer system for ID to text mapping consistent with certain aspects related to the present invention.

FIG. 1 illustrates system 100 for implementing ID to text mapping at run time. FIG. 1 includes a user 110, a user interface (UI) 120, network connections 170a-170b, a front end system 130, and a back end system 140. Front end system 130 may be implemented as a computer serving as a client computer, and may include an UI pattern engine 131, and a generic client proxy (GCP) 132. Back end system 140 may be implemented as a computer serving as a server computer, and may also include a service manager 142, service adaptation 133, and an enterprise services repository 150.

System 100 may be implemented as part of an enterprise services framework. An enterprise services framework is a computer framework that allows applications, such as services, to be aggregated to form composite business-level applications. Although FIG. 1 is described with respect to an enterprise services framework, system 100 can utilize any other framework or software architectural environment. For example, front end system 130 may be implemented as a client, and back end system 140 may be implemented as a server in a client server environment.

User 110 may be any entity. For example, user 110 may be a purchasing manager who fills out a purchase form through a user interface 120. User interface 120 may provide content, such as visual displays, to user 110. Moreover, user interface 120 may include a browser configured on front end system 130 for interacting with services, such as service adaptation 133. For example, the browser of user interface 120 may connect, at run time, to UI pattern engine 131 through network connections 170a to view and interact with content from back end system 140 using the generic client proxy 132. User 110 may request, at run time, an instance of a business object (e.g., a purchase order form) through user interface 120. User interface 120 may then request a purchase order form configuration from front end system 130.

Network connections 170a-170b may include, alone or in any suitable combination, a telephony-based network, a local area network (LAN), a wide area network (WAN), a dedicated intranet, wireless LAN, the Internet, a wireless network, a bus, or any other communication mechanisms. Further, any suitable combination of wired and/or wireless components and systems may be used to provide network connections 170a-170b. Moreover, network connections 170a-170b may be embodied using bi-directional, unidirectional communication links, or direct links. Further, network connections 170a-170b may implement protocols, such as Transmission Control Protocol/Internet Protocol (TCP/IP), Hyper Text Transfer Protocol (HTTP), Simple Object Access Protocol (SOAP), Remote Procedure Call (RPC), and the like.

UI pattern engine 131 may receive configuration information of the requested user interface design, such as the configuration information of the purchase order form, from user interface 120. The configuration information, such as the purchase order form and its configuration, may be predetermined (e.g., designed before run time). At run time, UI pattern engine 131 may interpret the configuration information, and transform the configuration information into an Application Programming Interface (API) call to service adaptation 133 through service manager 142 and generic client proxy 132. Run time represents the time period corresponding to the interactions of a user interface with applications, such as services, at a server.

Generic client proxy 132 may have an API that is accessible to UI pattern engine 131 and user interface 120. The service manager 142 at backend system 140 may provide an interface, such as a Remote Procedure Call (RPC) or a SOAP interface, to the generic client proxy 132 through network connection 170b. Generic client proxy 132 may be implemented to control the functionality available to user interface 120. For example, service manager 142 may include a variety of functions, but user interface 120 may be allowed access only to a subset of those functions. Moreover, generic client proxy 132 may buffer data requested by user interface 120 and delivered by service manager 142.

Generic client proxy 132 may call an API at service manager 142. Service manager 142 may include a message handler for handling messages to and from service manager 142; a change handler for handling changes affecting service adaptation 133 (e.g., changes that occur when data at the user interface 120 changes, such as button clicks, that affect a service provider or the corresponding business objects); a stack for storing changes associated with the change handler in a last in, first out manner is provided; and a controller for controlling dynamic properties of the instance (e.g., controlling at runtime whether a field is read-only, mandatory, invisible, enabled, and the like).

Service manager 142 may analyze the incoming API call from generic client proxy 132 that contains the configuration information of the requested user interface design, such as the configuration information of the purchase order form. If the configuration information requires ID to text mapping, service manager 142 may instantiate an instance of service adaptation 133 and pass the configuration information to service adaptation 133. Service manager 142 may ask service adaptation 133 to create an adapted object node, which has a structure containing all ID to text mapping text fields. For example, a designer may design a purchase order form to indicate that a product ID should be replaced at run time with descriptive text corresponding to the ID. In this example, service manager 142 may instantiate an instance of service adaptation 133 to implement ID to text mapping. Service manager 142 may ask service adaptation 133 to create an adapted object node containing a text field, which may be used for mapping product ID to product description.

Service adaptation 133 may instantiate a business object node according to the configuration information received from front end system 130. As noted above, a business object node refers to a component of a business object. At run time, service adaptation 133 creates an adapted business object node according to the configuration information received from front end system 130. Adapted business object node 225 is described below with respect to FIG. 2B. Adapted business object node 225 may then be used by service manager 142 when responding to the incoming API call from generic client proxy 132 to map ID to text.

Enterprise services repository 150 stores and organizes metadata about business objects and the related services. Enterprise services repository 150 may also store business object attributes, business object node structures, and relations among business objects. At design time, designer (also referred to as developer) may retrieve existing services from enterprise services repository 150 to help design new services and inter-relationships between services. At run time, service adaptation 133 may search for information stored in enterprise services repository 150.

Figure 2A:
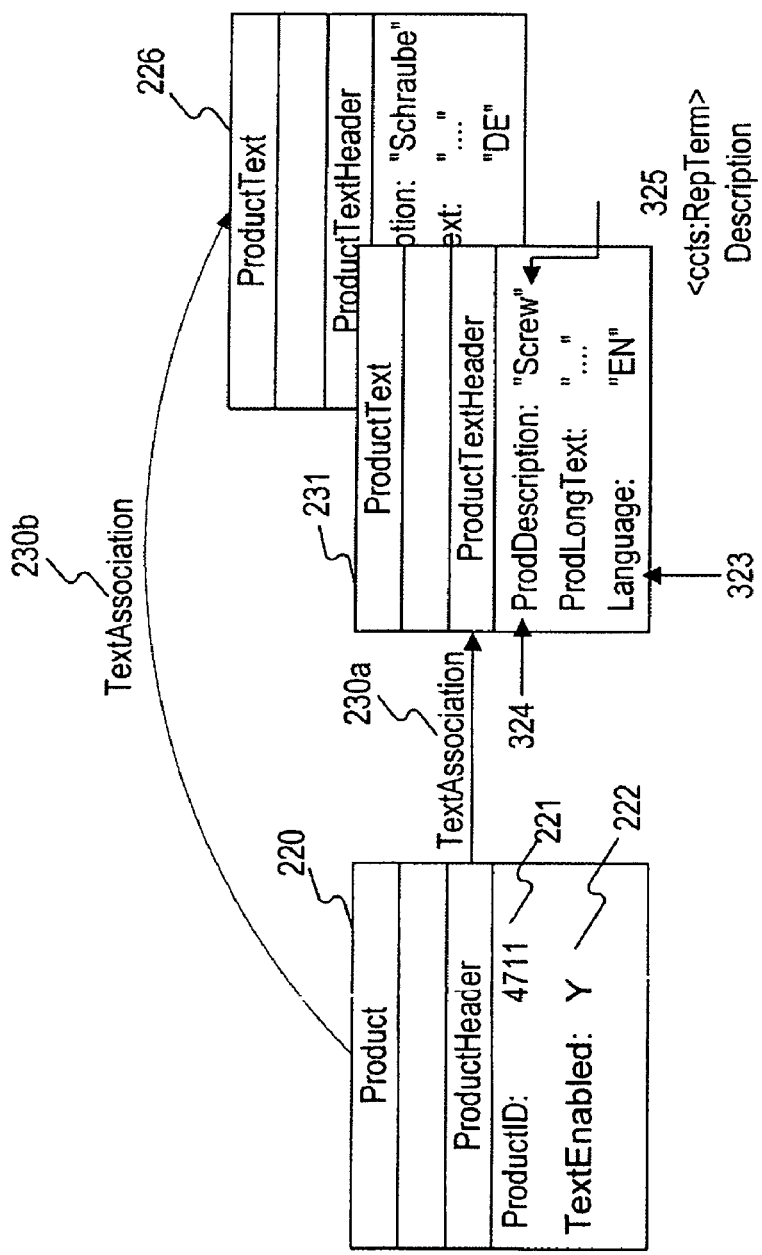
FIG. 2A illustrates an exemplary text association of ID to text mapping consistent with certain aspects related to the present invention.

FIG. 2A illustrates an exemplary business object node 220 with ID 221, text associations 230a and 230b, and text nodes 231 and 226. Referring to FIG. 2A, when designing the composition of business object nodes and their inter-relationships stored in enterprise services repository 150, a designer may create text node 231, associate text node 231 to business object node 220 by creating text association 230a. Text association 230a may be defined as "ID-Text-Mapping" type association. Text association 230a may be represented by a name, a description, a type, a target node name, and other mechanisms to associate nodes 220 to node 231. For instance, text association 230a may have a target node name defined as "Product Text" to link business object node 220 to text node 231. Text association 230a allows a service, such as ID to text mapping at service adaptation 133, to associate at run time business object node 220 to text node 231.

The composition of the nodes of FIG. 2A may be considered a schema. A schema is the organization or structure, such as the organization of a database or the structure of an object in an object oriented program. In object oriented programming, modeling (i.e., the analysis of objects that are used in a business or other context and the identification of the relationships among these data objects) leads to a schema, which can be stored in repository 150.

Business object node 220 may be referred to as a primary node since it may be primary to one or more text nodes. The ID-to-text mapping provided by service adaptation 133 may associate business object node 220 to a corresponding text node 231 by following text association 230a. Business object node 220 may include a field to indicate whether it has a text association. For example, business object node 220 may include a "Text Enabled" field 222 to indicate whether node 220 is associated with a text node, such as node 231. Business object node 220 may be implemented so that when node 220 has a text association, the text enable field 222 is checked (e.g., true or yes); when node 220 does not have a text association, the text enable field 222 is not checked (e.g., false or no). The use of text enable field 222 may improve the processing at run time for ID to text mapping. Alternatively, users of business object node 220 may loop over all available associations and look for any association with type "ID-Text-Mapping."

At design time, a designer may separate text description 324 from primary node 220 by first creating a data field of type having a declared type (e.g., ccts:Description 325). The separation of text 324 from primary node 220 thus enables the designer to create a text association to map an ID to text for business objects. At run time, service adaptation 133 may provide an ID to text mapping by using the declared type (e.g., "ccts:Description" 325) as an indicator for finding the text field for the ID to text mapping of text node 231.

Text node 231 may also include a language code attribute 323 for describing the language of text field 324. Moreover, to maintain the consistency of text nodes, at design time, a designer may create text nodes by making copies from a common template stored in enterprise services repository 150. The following table provides an example of a text node template stored in enterprise services repository 150, although other templates can also be used to create text nodes.

TABLE 1

| Structure | Description | Type |
|---|---|---|
| BONodeText | | |
| LanguageCode | Language Code | xsd:token |
| CountryCode | Country Code | xsd:token |
| LongText | Long Text | xsd:string |
| MediumText | Medium Text | xsd:string |
| ShortText | Short Text | xsd:string |
| MobileText | Text for Mobile Devices | xsd:string |

Referring to Table 1, "LanguageCode" indicates the language of the text. "CountryCode" represents a country associated with the selected language code. "LongText," "MediumText," "ShortText," and "MobileText" refer to different text formats. For example, if the text is provided over a mobile phone, the format, in this example "MobileText," may be different when compared to providing text over a wired network.

Node 220 may be considered a primary node, and may have many text associations, such as 230a and 230b. Each ID may map to many text fields, but each text field may map to only one ID. For example, one product ID "4711" may have text associations 230a and 230b to its product descriptions in many languages, such as English 231, German 226, and so forth. But text field 324 (e.g., "screw") may map to only one product ID "4711." A designer may create a text association filter to filter out all but one text association at run time. For example, when primary node 220 has multiple text associations, at run time, service adaptation 133 may use a text association filter for filtering out all but one text association when mapping the ID to text. The text association filter can use the language code to filter out text associations for all languages but the specified language code. In some cases, the logon language may be the specified language for the text association filter. Alternatively, if the text association filter is not used, the logon language can be the default language of text delivered to front end system 130 when the ID is mapped to text.

Figure 2B:
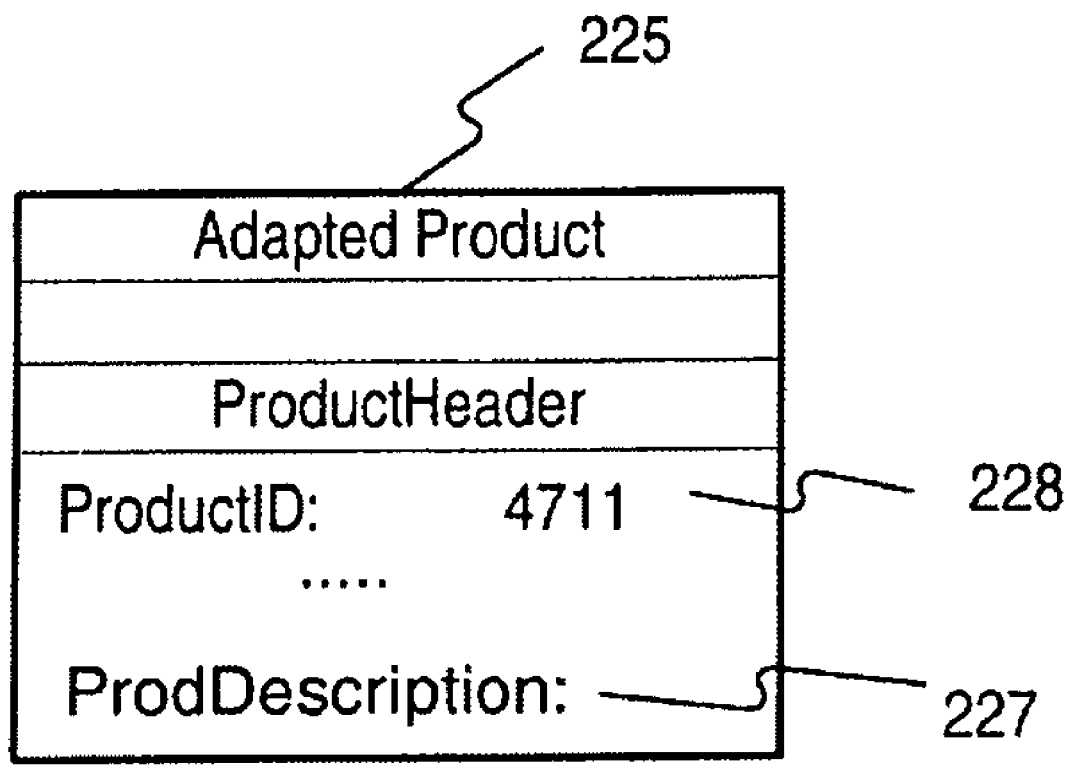
FIG. 2B illustrates an exemplary adapted node instantiated by service adaptation for ID to text mapping consistent with certain aspects related to the present invention.

FIG. 2B illustrates business object node 225 instantiated by service adaptation 133. Business object node 225 may be referred to as an "adapted" node because it is created by service adaptation 133 for providing an ID to text mapping at run time. Service adaptation 133 composes node 225 according to the received configuration information. Returning to the above purchase order example, business object node 225 is an example of an "adapted" node for product node 220. Service adaptation 133 may implement node 225 to include a field 228 for product ID and a text field 227, which may be determined at run time to include the appropriate text based on a text association.

Figure 2C:
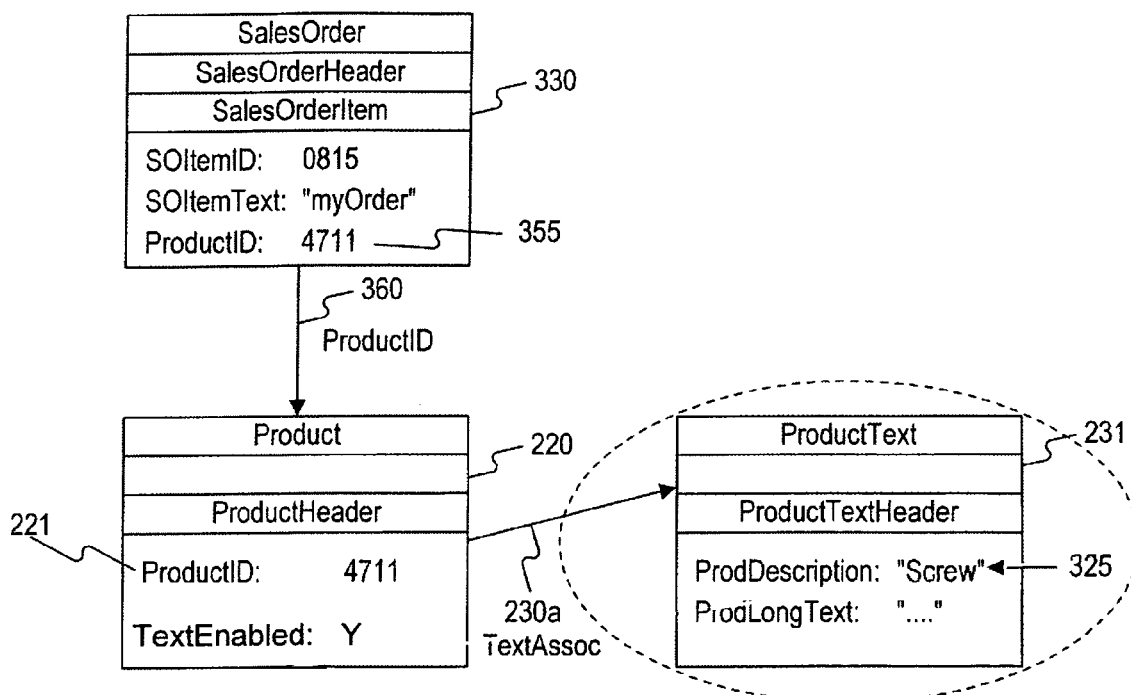
FIG. 2C illustrates exemplary business object nodes having a foreign key association consistent with certain aspects related to the present invention.

FIG. 2C illustrates exemplary business object nodes 220, 330 and the corresponding foreign key associations and text associations. Product ID 355 is a foreign key in business object node 330 because it refers to the primary key 221 of business object node 220. Node 220 may thus be referred to as a secondary node in this relationship. Primary business object node 330 may refer to secondary node 220 via a foreign key association 360 defined by product ID 355. For example, product ID 355 may include a value (e.g., a key, a location, a memory location, and the like) that associates node 330 to node 220.

When service adaptation 133 provides ID to text mapping, service adaptation may determine the foreign key associations, such as foreign key association 360 of primary node 330, and the corresponding secondary nodes, such as node 220. Secondary node 220 may have a text field or, if it is text enabled, a text association 230a. When secondary node 220 has a text association 230a, service adaptation 133 may determine, based on text association 230a, text node 231 and then retrieve text 325. Alternatively, the secondary node may have a text field instead of a text association. In that case, service adaptation 133 may retrieve the text directly from the text field of the secondary node. As such, service adaptation 133 for ID to text mapping may automatically resolve foreign key associations and deliver requested text to front end system 130 at run time.

Figure 3:
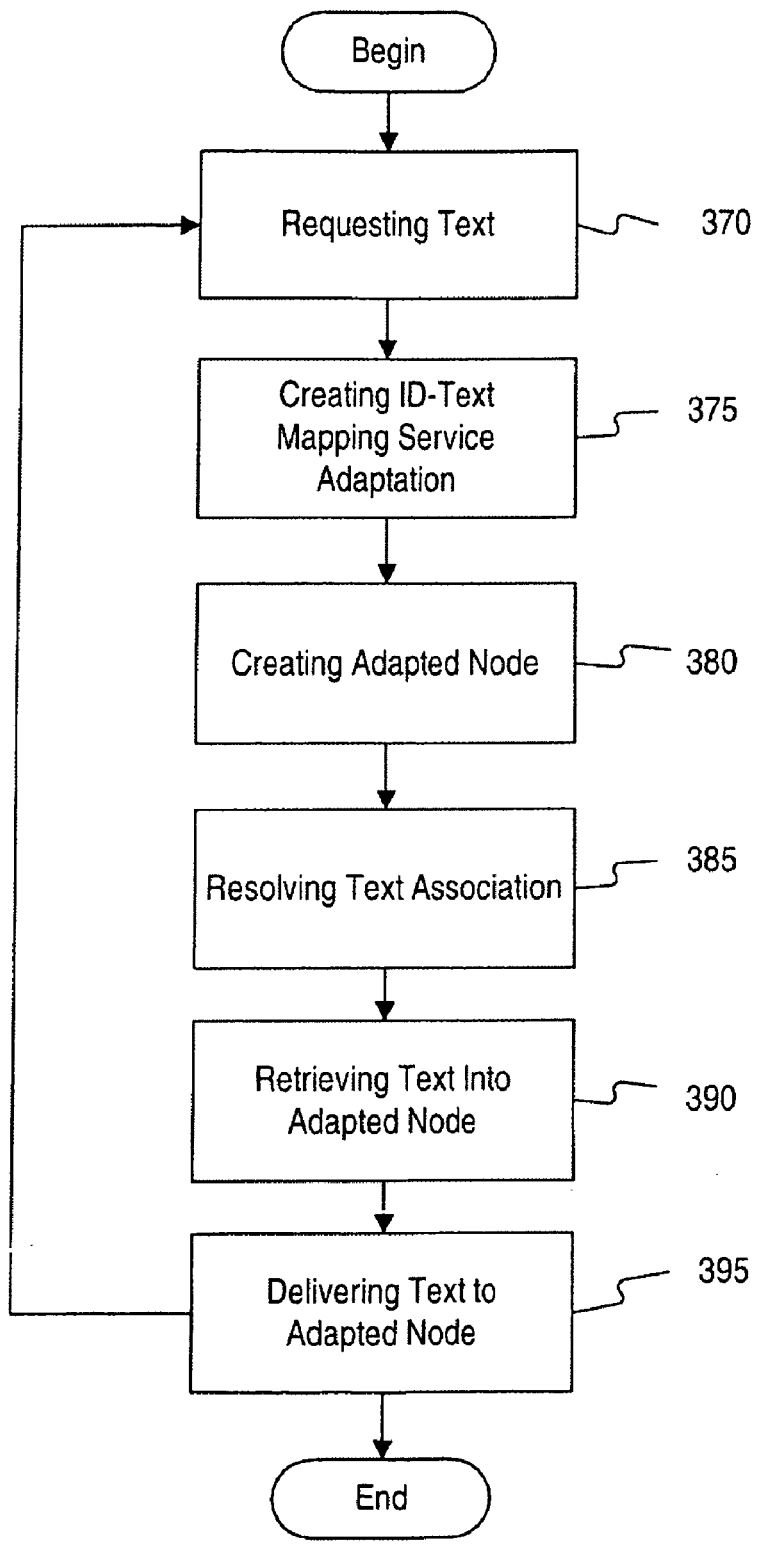
FIG. 3 illustrates an exemplary flow chart showing steps of ID to text mapping consistent with certain aspects related to the present invention.

FIG. 3 illustrates a flowchart with steps for mapping, at run time, ID to text based on a text association. Referring to FIGS. 1, 2A, 2B, and 2C, through user interface 120, user 110 may request an instance of a business object. For example, user 110 may interact with a business object associated with service adaptation 133 through user interface 120, generic client proxy 132, and service manager 142. The interaction may request a business object (e.g., a purchase order form) from the service provider. The business object may further include a business object node, such as node 220, that has text enabled field 222.

At run time, UI pattern engine 131 may determine the configuration information of the requested business object node 220 and transform the configuration information for node 220 into instructions for an API call to other components, such as generic client proxy 132, service manager 142, and/or service adaptation 133. For example, by making such an API call, UI pattern engine 131 may retrieve text corresponding to an ID for business object node 220. To request the text corresponding the ID 221, UI pattern engine 131 may call the API of generic client proxy 132, which makes an outbound call to the API of service manager 142 (step 370). Returning to the above example of a purchase order form, the purchase order form design may require that the product description be displayed instead of the product ID 221 for business object node 220. UI pattern engine 131 may make an API call to generic client proxy 132 to request the retrieval of the product description corresponding to product ID 221.

In response to the API call from generic client proxy 132, service manager 142 may instantiate, at back end system 140, service adaptation 133 for ID to text mapping (step 375).

To service the call from generic client proxy 132 for an ID to text mapping, service adaptation 133 may instantiate an adapted node, such as node 225 at FIG. 2B (step 380). Returning to the above example of a purchase order form, the API call from generic client proxy 132 contains the configuration information for displaying node 220 in a purchase order form at user interface 120. The configuration information may indicate that a text description is required to display node 220. Service adaptation 133 for ID to text mapping may create adapted node 225 with an additional text field 227. Text field 227 may be blank when the adapted node is first instantiated. However, text field 227 will hold the text for product description when service adaptation 133 for ID to text mapping retrieves the text based on text association 230a.

As shown in FIG. 2A, primary node 220 has text association 230a. When service adaptation 133 makes a call for ID to text mapping, service adaptation 133 may perform a text retrieval operation on primary node 220. From primary node 220, service adaptation 133 may resolve text association 230a by following text association 230a to text node 231 (step 385). For example, text association may be a pointer or key that maps node 220 to node 231. After finding text node 231, service adaptation 133 may copy the product description text "screw" from text node 231 into text field 227 of adapted node 225 (step 390).

As shown in FIG. 2C, when primary node 330 has a foreign key association, service adaptation 133 may follow the foreign key association, such as foreign key association 360 of primary node 330, to find the corresponding secondary node, such as node 220. Secondary node 220 may have a text field or, if it is text enabled, a text association 230a. When secondary node 220 has a text association 230a, service adaption 133 may navigate to, based on text association 230a, text node 231, and then retrieve text 325. Alternatively, the secondary node may have a text field instead of a text association. In that case, service adaptation 133 may retrieve the text directly from the text field of the secondary node (step 390).

After the text has been retrieved and placed into the text field 227 of the adapted node 225, service adaptation 133 has mapped ID to text and may thus deliver the text to front end system 130 as adapted node 225 (step 395).

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

It is to be understood that the foregoing description is intended to illustrate and not to limit the scope of the invention, which is defined by the scope of the appended claims. Other embodiments are within the scope of the following claims.

What is claimed is:

1. A computer-implemented method for mapping at run time a value to a text in a system, the system comprising a first computer including a user interface and a second computer including a service adapter, the method comprising:

receiving at run time a request, by a service manager and from the user interface at the first computer, the request being associated with an object node, the request made in response to the request from the user interface to obtain configuration information for a page to be presented at the user interface, the service manager including an application programming interface to receive the request, the service manager configured to analyze the request to determine whether to instantiate the service adapter to map the value to the text;

instantiating, by a service manager at the second computer, the service adapter for mapping at run time the value included in the object node to the text included in a text node based on a text association selected at runtime from a plurality of text associations, the text associations determined before run time, each of the text associations linking the object node to a different text node including a corresponding text to be mapped at run time to the object node, the object node including a text enabled field to indicate that the object node includes the text association and text node to be mapped; and providing to the user interface at run time, the text determined based on the text association, such that the text is responsive to the request from the user interface.

2. The method of claim 1, wherein receiving further comprises: determining whether at least one of the object nodes has the text association.

3. The method of claim 2, wherein determining further comprises: determining the text association by checking a text enabled field.

4. The method of claim 1, wherein instantiating further comprises: determining the text association by modeling object nodes in a repository.

5. The method of claim 1, further comprising: determining the text based on a filter.

6. The method of claim 1, further comprising: instantiating an adapted node, the adapted node having at least one text field.

7. The method of claim 1, further comprising: determining the text association by navigating to a text node.

8. The method of claim 1, wherein receiving further comprises: associating the request with the one or more object nodes.

9. A system for mapping at run time a value to a text, the system comprising: a processor; and a memory, wherein the processor and the memory are configured to perform a method comprising:
   receiving at run time a request, by a service manager and from the user interface at the first computer, the request being associated with an object node, the request made in response to the request from the user interface to obtain configuration information for a page to be presented at the user interface, the service manager including an application programming interface to receive the request, the service manager configured to analyze the request to determine whether to instantiate the service adapter to map the value to the text;
   instantiating, by a service manager at the second computer, the service adapter for mapping at run time the value included in the object node to the text included in a text node based on a text association selected at runtime from a plurality, of text associations, the text associations determined before run time, each of the text associations linking the object node to a different text node including a corresponding text to be mapped at run time to the object node, the object node including a text enabled field to indicate that the object node includes the text association and text node to be mapped; and
   providing to the user interface at run time, the text determined based on the text association, such that the text is responsive to the request from the user interface.

10. The system of claim 9, wherein receiving further comprises: determining whether at least one of the nodes has the text association.

11. The system of claim 10, wherein determining further comprises: determining the text association by checking a text enabled field.

12. The system of claim 9, wherein instantiating further comprises: determining the text association by modeling object nodes in a repository.

13. The system of claim 9, further comprising: determining the text based on a filter.

14. The system of claim 9, further comprising: instantiating an adapted node, the adapted node having at least one text field.

15. The system of claim 9, further comprising: determining the text association by navigating to a text node.

16. The system of claim 9, wherein receiving further comprises: associating the request with the one or more object nodes.

17. A computer-readable storage medium containing instructions to configure a processor to perform a method for mapping at run time a value to a text, the method comprising:
   receiving at run time a request, by a service manager and from the user interface at the first computer, the request being associated with an object node, the request made in response to the request from the user interface to obtain configuration information for a page to be presented at the user interface, the service manager including an application programming interface to receive the request, the service manager configured to analyze the request to determine whether to instantiate the service adapter to map the value to the text;
   instantiating, by a service manager at the second computer, the service adapter for mapping at run time the value included in the object node to the text included in a text node based on a text association selected at runtime from a plurality of text associations, the text associations determined before run time, each of the text associations linking the object node to a different text node including a corresponding text to be mapped at run time to the object node, the object node including a text enabled field to indicate that the object node includes the text association and text node to be mapped; and
   providing to the user interface at run time, the text determined based on the text association, such that the text is responsive to the request from the user interface.

* * * * *